Nov. 20, 1951     I. R. STOUGHTON     2,575,534
WING TIP FUEL TANK

Filed July 3, 1948     2 SHEETS—SHEET 1

INVENTOR.
IVAN R. STOUGHTON
BY Herbert E. Metcalf
Attorney

Nov. 20, 1951 — I. R. STOUGHTON — 2,575,534
WING TIP FUEL TANK
Filed July 3, 1948 — 2 SHEETS—SHEET 2
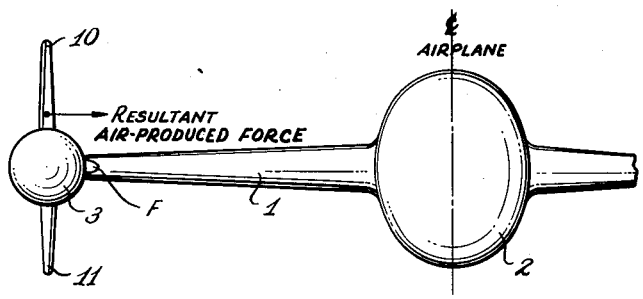
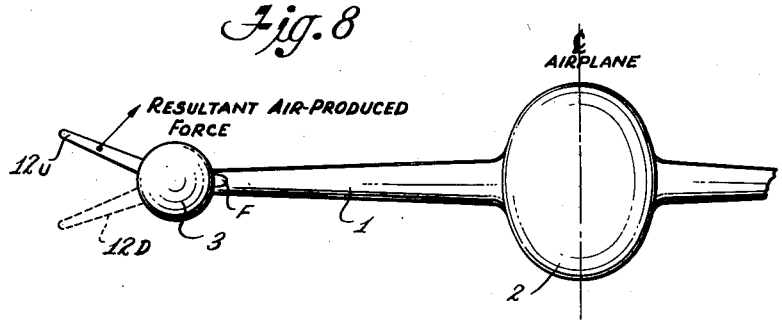
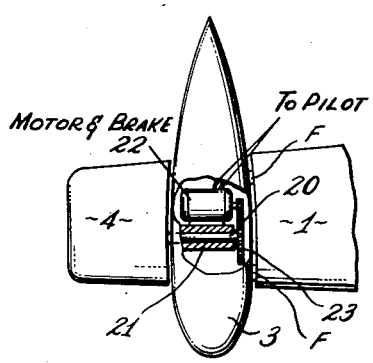
INVENTOR.
IVAN R. STOUGHTON
BY Hubert E. Metcalf
Attorney Patented Nov. 20, 1951

2,575,534

UNITED STATES PATENT OFFICE 2,575,534

WING-TIP FUEL TANK

Ivan R. Stoughton, Los Angeles, Calif., assignor to Northrop Aircraft, Inc., Hawthorne, Calif., a corporation of California Application July 3, 1948, Serial No. 36,989

8 Claims. (Cl. 244—135)

The present invention relates to wing tip fuel tanks for airplanes and, more particularly, to wing tip tanks that are released from the wing tip of an airplane and dropped after the fuel therein has been consumed by the airplane engine or engines.

Modern high speed airplanes, particularly those propelled by gaseous combustion turbines, are faced with a serious fuel storage problem. The fuel consumption of jet engines, for example, is high, and for high speeds the wing sections are thin, preventing the installation of large fuel tanks therein. In consequence, auxiliary fuel tanks have been resorted to, mounted outside of the aircraft, usually at or near the wing tips, and attached to the airframe by a fitting that can be disconnected at the will of the pilot to permit separation of the tank from the airplane. In use, the fuel from such tanks is customarily consumed first, the auxiliary tanks dropped, the airplane engines then being operated on internally stored fuel.

At first such auxiliary tanks contained only 100 to 300 gallons of fuel. As the demand for longer ranges increased, such tanks have been increased in size to hold as much as 625 gallons of fuel, which, in a tank weighing 450 pounds, will give a total weight of tank and fuel of about 4,570 pounds, i.e., over two tons.

Such tanks, even though of the best streamlined shape, reduce the lift/drag ratio L/D of the entire airplane, particularly at take-off speeds, and, because of their weight, impose heavy loads on the wing through the attachment fittings.

These loads, particularly those acting on the attachment fittings, are highly important. In the design of fittings which hold the tank to the airplane, it is necessary that these fittings be not only sufficiently strong to carry the loads, but also the fittings must be designed to readily release to drop the tank even when full of fuel.

When a tank is released, there must be a minimum of friction from the fitting, as the tank slides away from the wing tip, in order that the tank may not fail to release when a disconnect action is made by the airplane pilot. In fact, a number of airplanes at present employ power operated means, such as hydraulic push rods or controlled explosives, to ensure positive separation of the tank from the airplane under all conditions.

The smaller the shear loads and bending moments to be transmitted through the attachment the less the friction becomes, and the attachment design may thus be simplified.

It is an object of the present invention to provide a means and method for greatly improving the L/D of an airplane carrying wing tip fuel tanks to improve take-off and climb performance and thus increase range, or for decreasing the shear and other loads imposed by detachable wing tip tanks on the wings of the airplane at and inboard of the tank attachments.

In broad terms, the present invention comprises the use of a detachable fuel tank for airplanes, having an airfoil surface, or surfaces, formed as an integral part of the tank whereby added lift, reduced attachment loads, and higher airplane L/D ratios are obtained, singly or in combination.

The present invention can be more fully understood by reference to the drawings in which:

Figures 7 and 8 are diagrammatic front views of an airplane equipped with wing tip fuel tanks embodying additional forms of the present invention.

Figure 9 is a top plan view, partly cut away, of a variable lift airfoil attached to a wing tip tank.

Figure 1:
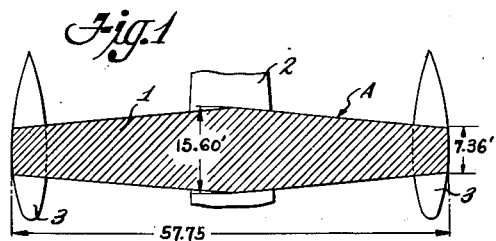
Figure 1 is a diagrammatic plan view of an airplane wing with conventional wing tip tanks.

Referring first to Figure 1, an airplane wing 1 extends on each side of a fuselage as indicated by line 2 to terminate in conventional detachable wing tip tanks 3.

Tanks 3 are of elongated streamlined shape and are detachably and symmetrically held on the wing tips of the airplane. They may be butted to the wing tip or be recessed somewhat to receive the wing tip. In either case, they are attached to the airplane through a heavy tank fitting F, shown diagrammatically in Figures 5 and 6, that can be disconnected by the pilot of the airplane when a tank-airplane separation is desired. These fittings must carry all the stresses between the tank and the airplane frame, they must be sufficiently strong to withstand all tank loads whether full or empty, and the fittings must be so constituted that the tank can be separated from the airplane, either full or empty, at will.

In order that the present invention can be more fully understood, a comparison of various pertinent characteristics of two airplanes will be given herein, each airplane having the same design, except that one airplane is fitted with conventional 625 gallon drop tanks, the other being provided with wing tip tanks embodying one form of the present invention carrying the same amount of fuel.

The dimensions of the compared airplanes are as follows:

*Airplane A*

| | |
|---|---:|
| Weight of airplane A with wing tip fuel tanks filled and installed _____lbs__ | 36,000 |
| Wing span with tanks installed (including projected tip area) _____ft__ | 57.75 |
| Wing root chord _____ft__ | 15.60 |
| Wing tip chord (on outer surface of tank) _____ft__ | 7.36 |
| Aspect ratio _____ | 5.03 |
| Gallons of fuel in each wing tip tank ___ | 625 |
| Weight of fuel in each tank (6.6 lbs. per gallon) _____lbs__ | 4,120 |
| Weight of each tank empty _____lbs__ | 450 |
| Weight of each tank and fuel _____lbs__ | 4,570 |
| Speed of airplane _____M. P. H.__ | 125 to 400 |

Figure 5:
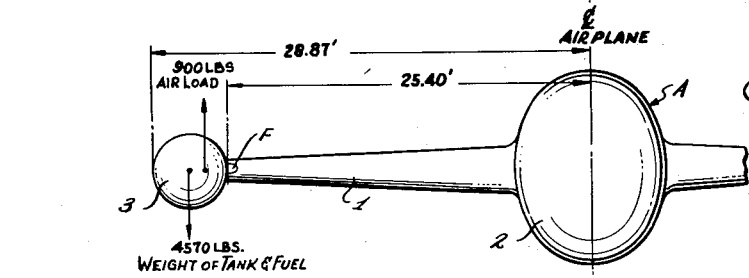
Figure 5 is a diagrammatic front view of the airplane of Figure 1.

This airplane is diagrammatically shown in Figures 1 and 5.

*Airplane B*

Figure 2:
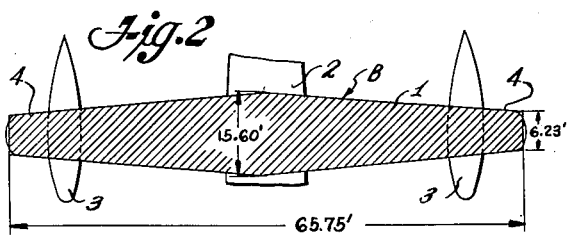
Figure 2 is a diagrammatic plan view of an airplane equipped with wing tip tanks embodying one form of the present invention.
Figure 6:
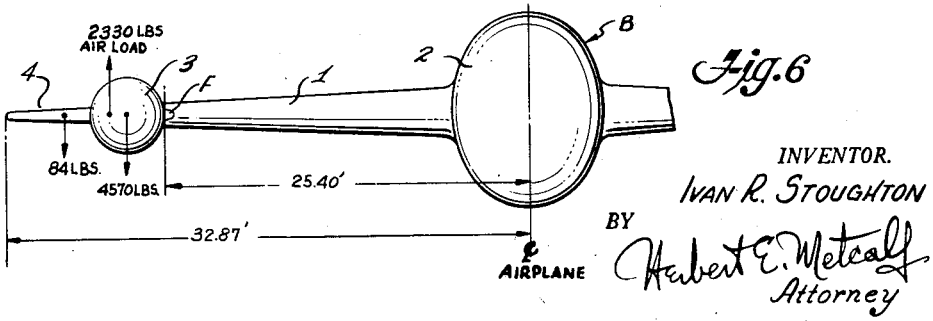
Figure 6 is a diagrammatic front view of the airplane of Figure 2.

The airplane shown in Figures 2 and 6 is designated as airplane B, and differs from airplane A only by having an auxiliary lifting airfoil 4 attached to each wing tip tank 3. This auxiliary airfoil is positioned to extend outwardly from each tip tank to continue the wing planform in the plane of wing 1, terminating with a chord of 6.23 ft.

The span of airplane B, including the auxiliary airfoils 4 is 65.75 feet, the aspect ratio is 6.02, each auxiliary airfoil is 84 pounds, making airplane B weigh 36,168 pounds with fuel tanks full.

Figure 3:
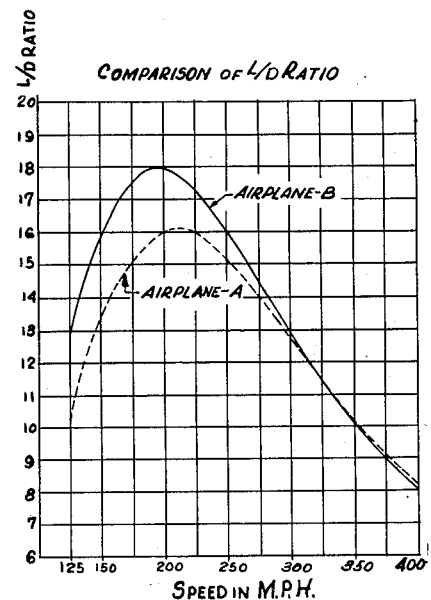
Figure 3 is a representation of curves showing L/D ratios of the airplanes of Figures 1 and 2 at various speeds in level flight.

The L/D ratios with respect to speed in M. P. H. are plotted for airplanes A and B in Figure 3, the respective curves being labelled. A very distinct improvement in L/D ratio is shown for airplane B, whose tanks are provided with auxiliary airfoils. Improvement is shown from 125 M. P. H. to about 310 M. P. H. with a peak improvement at around 125 M. P. H. This increased L/D ratio at the lower speeds is of prime value at take-off when the airplane is heavily loaded as will be later discussed.

Figure 4:
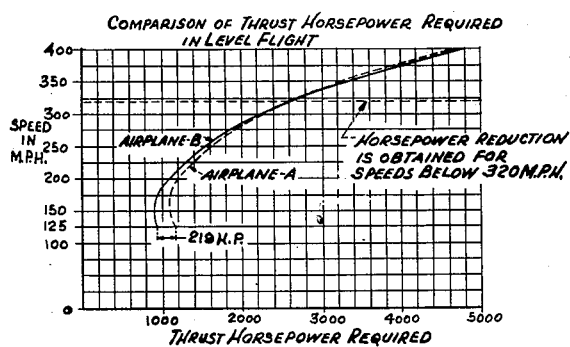
Figure 4 is a representation of curves showing thrust horsepower required for level flight of the airplanes of Figures 1 and 2.

The improvement in L/D ratio at low speeds can be translated into horsepower as shown in Figure 4 where the speeds in M. P. H. of airplanes A and B are plotted against thrust horsepower required. Again, the superiority of airplane B can be clearly seen at speeds of from 125 to 310 M. P. H.

The take-off, climb and maximum range cruising performance are affected greatly by the overall L/D ratio of the airplane at the slow speed end of the speed range. The greater the L/D ratio, the better the take-off, climb and range performance will be.

It should be noted that an airplane in taking off with full fuel tanks for a long trip, needs to have as good take-off and climb performance as possible to get the airplane up to an efficient cruising altitude and levelled off for maximum range flight. Fuel saved on the take-off and initial climb will then be available to extend the range.

Reference to Figure 4 will show that for level flight speeds below 320 M. P. H. there will be a reduction in fuel consumption and, consequently, an extension of range is obtained.

On extended flights where the extreme high speed performance is not needed or used on the outward journey, the extra drag of the auxiliary airfoil is not detrimental and the airplane reverts to its maximum high speed performance on the return flight after the tanks are dropped.

The wing loads at or inboard of attachment of the wing tanks are also materially reduced by attaching an auxiliary airfoil to the wing tip tanks.

Figure 5 shows a diagrammatic front view of airplane A indicating the weights and airloads involved when the fuel tanks are full, with the airplane in level flight.

In this case values are as follows:

| | |
|---|---:|
| Shear downward from tank to wing__lbs.__ | 3,670 |
| Net bending moment (placing tension in upper portion of attachment F) _____ft. lbs.__ | 6,980 |

Figure 6 diagrammaticaly shows the same type of loads in airplane B including the airload supplied by the auxiliary airfoil 4.

In this case the load values are:

| | |
|---|---:|
| Shear downward from tank to wing__lbs.__ | 2,324 |
| Net bending moment (placing tension in upper portion of attachment F) _____ft. lbs.__ | 1,598 |

With fuel tanks, the shear, and attachment moment can be compared as follows:

| | | |
|---|---|---:|
| Net shear downward— | | |
| Airplane A | lbs.__ | 3,670 |
| Airplane B | lbs.__ | 2,324 |
| Net saving in downward shear | lbs.__ | 1,346 |
| Net bending moment (placing tension in upper portion of attachment F)— | | |
| Airplane A | ft. lbs.__ | 6,980 |
| Airplane B | ft. lbs.__ | 1,598 |
| Net saving in bending moment | ft. lbs.__ | 5,382 |

However, the loads are reversed on the tank attachment fittings in airplane B when the fuel in the tanks is consumed. The loads are as follows in airplane B when the tanks are empty:

| | |
|---|---:|
| Shear upward, airplane B_____lbs.__ | 1,796 |
| Net bending moment (placing tension in lower portion of attachment F) _____ft. lbs.__ | 5,812 |

Thus, the maximum moment on the tank fitting of airplane A is 6,980 ft. lbs. (tank full) and the maximum moment on the tank fitting of airplane B is 5,812 ft. lbs. (tank empty), a net reduction in the moment that has to be carried through the tank attachment fittings of about 17%.

This clear reduction in moment plus the distinct gain in L/D ratio, particularly at the lower speeds, makes the detachable wing tip tank of the present invention ideally suited for the transport of large quantities of fuel, and can be reflected in increased range for a given amount of fuel and in the reduction of weight in the fittings and to some extent in the wing itself adjacent the fittings.

It will be noted from the above description of one embodiment of the present invention that a lift equal to about one-third of the fuel weight carried has been added to the tank, with very little increase in drag of the tank. A lift substantially greater than one-third the fuel weight would increase the attachment loading in airplane B when the tank is empty, over that of airplane A when the tank is full. However, a still greater increase in lift might still greatly benefit the L/D ratio of the airplane. For this reason, it is not desired to limit the ratio of lift added to weight of fuel to the particular value of one-third.

While the present invention has so far been particularly described for one configuration of airplane, tip tank, and auxiliary airfoil design, it will be apparent to those skilled in the art, within the scope of the appended claims, that the configuration of the wing tip tanks can be varied from the point of view of aerodynamic contour and auxiliary airfoil placement, so that a substantial force is produced on the tank sufficient to materially reduce the loads on the tank attachment fittings.

For example, a pair of vertical airfoil surfaces 10 and 11 can be used, as shown in Figure 7, one above and the other beneath the tank 3 respectively. In this design, no direct lift is provided on the tank itself, and therefore the shear loads are not reduced in flight, but the bending moment applied to the wing attachment is easily reduced to any desired degree by making the upper vertical airfoil 10 area greater than that of the lower vertical airfoil 11, and inclining the surfaces to the relative wind direction so that a moment of force is produced at the tank attachment fitting F in the opposite direction to that moment produced by the tank and fuel weight. This design also somewhat improves the overall L/D ratio in that the vertical airfoils 10 and 11 act as flow straighteners, reducing spanwise air flow off the wing tips, which condition may cause a loss of lift. However, lateral maneuverability may be somewhat reduced by this end plate effect, this reduction, however, not being effective after release of the tanks.

It may also be desirable to place an auxiliary airfoil 12, as shown in Figure 8, where it can assume a position D pointing angularly downwardly at the tip, or an alternate position U pointing angularly upwardly at the tip. A combination of direct lift, reduced tank attachment bending moments, and endwise directional forces is thus obtained.

In case it appears desirable to increase the lift added to the tank to the point where the empty tank up-load approaches the full tank down-load, the advantages of the present invention may still be obtained by making the lift of the auxiliary airfoil variable in flight, as shown schematically in Figure 9.

Here the auxiliary airfoil 4 is attached to tank 3 by a shaft 20 journalled in tank 3 on bearing 21. Shaft 20 is preferably located near the aerodynamic center of the airfoil 4. Shaft 20 is rotated by a braked motor 22 which, as well known in the art, is solidly braked when not energized, the brake automatically releasing when the motor is started. Motor 22 rotates shaft through reducing gears 23.

Motor 22 is placed under the control of the pilot, the wires for the motor being detachably led through fittings F as is customarily accomplished at present when tip tank lights are utilized. In this manner, the airfoil 4 can be positioned by the pilot to provide maximum lift when the tank is full and minimum lift when the tank is empty, thus preventing the increase in up-load due to use of fuel in the tank.

It will thus be seen that in accordance with the present invention the tanks can be designed to give desired and favorable combinations of L/D ratios, shear load, and bending moments, merely by proper design and location of an airfoil surface attached to, or formed as a part of, a wing tip fuel tank.

What is claimed is:

1. A detachable wing tip fuel tank for an airplane, said tank having a streamlined, laterally symmetrical body of substantially circular cross section suitable for containing fuel, and an airfoil projecting from one side only of said body of substantially lesser thickness than the major diameters of said body.

2. A detachable wing tip fuel tank for an airplane, said tank having a streamlined, laterally symmetrical body of substantially circular cross section suitable for containing fuel, a lifting airfoil projecting from one side only of said body of substantially lesser thickness than the major diameters of said body, and means for releasably attaching said tank to an airplane wing tip on the opposite side of said body, in the plane of said airfoil.

3. In combination with an airplane wing, a wing tip fuel tank having a streamlined laterally symmetrical body of substantially circular cross section, with major diameters thereof substantially larger than the tip thickness of said wing, means for releasably attaching said body to the end of said airplane wing for release in flight and a fuel free airfoil attached to said body, and extending outwardly from said body, said airfoil forming a completed projection of said wing in planform taper and in thickness taper.

4. In combination with an airplane wing, a wing tip fuel tank having a streamlined laterally symmetrical body of substantially circular cross section, with major diameters thereof substantially larger than the tip thickness of said wing, means for releasably attaching said body to the end of said airplane wing for release therefrom in flight, and a lifting fuel free airfoil attached to said body and extending outwardly from said body in the plane of said wing.

5. In combination with the wing of an airplane, a wing tip fuel tank having a streamlined laterally symmetrical fuel holding body of substantially circular cross section projecting above and below the respective upper and lower surfaces of said wing, means for releasably attaching said body to the end of said airplane wing for release therefrom in flight, and a fuel free airfoil attached to said body and extending outwardly from said body in the plane of said wing, said airfoil being shaped as a continuation of the planform of said wing, said airfoil being shaped to provide a lift sufficient to substantially reduce the net shear and bending moments in said attaching means, and to increase the L/D ratio of the airplane at low speeds.

6. In combination with the wing of an airplane, a wing tip fuel tank having a streamlined laterally symmetrical fuel holding body of substantially circular cross section projecting above and below the respective upper and lower surfaces of said wing, means for releasably attaching said body to the end of said wing for release therefrom in flight, and a fuel free airfoil attached to said body and extending outwardly from said body, said airfoil being positioned to provide an air derived force directed upwardly to substantially reduce the net shear and bending moments in said attaching means when fuel is in said body.

7. Apparatus in accordance with claim 1, wherein means are provided to change the angle of attack of said airfoil with respect to said body.

8. Apparatus in accordance with claim 3 wherein actuating means are provided in said tank to change the angle of attack of said airfoil with respect to the body of said tank and wherein control means are provided for said actuating means, said control means being separable at the attachment line of said body and said wing tip.

IVAN R. STOUGHTON.

REFERENCES CITED

The following references are of record in the file of this patent:

UNITED STATES PATENTS

| Number | Name | Date |
| --- | --- | --- |
| 1,890,012 | Alfaro | Dec. 6, 1932 |
| 2,105,307 | Akerman | Jan. 11, 1938 |
| 2,375,423 | Lobelle | May 8, 1945 |
| 2,416,104 | Lerche | Feb. 18, 1947 |